United States Patent
Kim et al.

(10) Patent No.: US 8,817,964 B2
(45) Date of Patent: Aug. 26, 2014

(54) TELEPHONIC VOICE AUTHENTICATION AND DISPLAY

(75) Inventors: Moon J. Kim, Wappingers Falls, NY (US); Eric T. C. Yee, Los Angeles, CA (US)

(73) Assignee: International Business Machines Corporation, Armonk, NY (US)

(*) Notice: Subject to any disclaimer, the term of this patent is extended or adjusted under 35 U.S.C. 154(b) by 1567 days.

(21) Appl. No.: 12/028,987

(22) Filed: Feb. 11, 2008

(65) Prior Publication Data

US 2009/0202060 A1    Aug. 13, 2009

(51) Int. Cl.
| | |
|---|---|
| H04M 3/42 | (2006.01) |
| H04M 11/00 | (2006.01) |
| H04M 1/00 | (2006.01) |
| H04L 12/16 | (2006.01) |
| H04Q 11/00 | (2006.01) |
| H04N 7/14 | (2006.01) |

(52) U.S. Cl.
USPC .................. 379/202.01; 379/93.21; 379/158; 370/260; 455/416; 348/14.08

(58) Field of Classification Search
USPC .......... 379/202.01, 90.01, 93.01, 93.21, 157, 379/158, 201.01, 207.01; 370/259, 260, 370/261, 262; 455/414.1, 416; 348/14.01, 348/14.02, 14.03, 14.04, 14.05, 14.06, 14, 348/7, 14.08, 14.09, 14.1, 14.11, 14.12, 348/14.13, 14.14, 15.15, 14.16
See application file for complete search history.

(56) References Cited

U.S. PATENT DOCUMENTS

| | | |
|---|---|---|
| 4,961,229 A | 10/1990 | Takahashi |
| 5,231,670 A | 7/1993 | Goldhor et al. |
| 5,233,556 A | 8/1993 | Matsuda et al. |
| 5,414,755 A | 5/1995 | Bahler et al. |
| 5,499,288 A | 3/1996 | Hunt et al. |
| 5,548,647 A | 8/1996 | Naik et al. |
| 5,717,743 A | 2/1998 | McMahan et al. |
| 5,752,231 A | 5/1998 | Gammel et al. |
| 5,893,057 A | 4/1999 | Fujimoto et al. |
| 5,897,616 A | 4/1999 | Kanevsky et al. |
| 5,946,654 A | 8/1999 | Newman et al. |

(Continued)

FOREIGN PATENT DOCUMENTS

| | | |
|---|---|---|
| GB | 2388947 A | 11/2003 |
| JP | 07162536 | 6/1995 |

OTHER PUBLICATIONS

Dersch, D. R., "The Acoustic Finger Print: A Method for Speaker Identification, Speaker Verification, and Accent Identification", Proc. of the 6th Australasian International conference on Speech Science and Technology, Adelaide, Dec. 1996, pp. 263-268.

(Continued)

Primary Examiner — Khai N Nguyen
(74) Attorney, Agent, or Firm — Lisa Ulrich; Hoffman Warnick LLC

(57) ABSTRACT

An improved solution for telephonic voice authentication and display is provided. A method of identifying conference call participants includes detecting a sound made by one of conference call participants; identifying this conference call participant based on the sound; and then displaying an attribute of the conference call participant to one of the other conference call participants. The attribute may include a picture, a name, and/or other information related to the identified conference call participant.

18 Claims, 4 Drawing Sheets

(56) References Cited

U.S. PATENT DOCUMENTS

| | | | |
|---|---|---|---|
| 5,991,617 | A | 11/1999 | Powell |
| 6,006,175 | A | 12/1999 | Holzrichter |
| 6,061,653 | A | 5/2000 | Fisher et al. |
| 6,078,807 | A | 6/2000 | Dunn et al. |
| 6,185,536 | B1 | 2/2001 | Haber et al. |
| 6,192,255 | B1 | 2/2001 | Lewis et al. |
| 6,205,424 | B1 | 3/2001 | Goldenthal et al. |
| 6,219,407 | B1 | 4/2001 | Kanevsky et al. |
| 6,233,555 | B1 | 5/2001 | Parthasarathy et al. |
| 6,246,751 | B1 | 6/2001 | Bergl et al. |
| 6,377,699 | B1 | 4/2002 | Musgrave et al. |
| 6,389,397 | B1 | 5/2002 | Otto |
| 6,393,305 | B1 | 5/2002 | Ulvinen et al. |
| 6,457,043 | B1 | 9/2002 | Kwak et al. |
| 6,480,825 | B1 | 11/2002 | Sharma et al. |
| 6,577,997 | B1 | 6/2003 | Gong |
| 6,618,702 | B1 | 9/2003 | Kohler et al. |
| 6,697,778 | B1 | 2/2004 | Kuhn et al. |
| 6,757,361 | B2 | 6/2004 | Blair et al. |
| 6,810,116 | B1 | 10/2004 | Sorensen et al. |
| 6,853,716 | B1 * | 2/2005 | Shaffer et al. ............ 379/202.01 |
| 6,865,264 | B2 | 3/2005 | Berstis |
| 6,868,149 | B2 | 3/2005 | Berstis |
| 6,937,702 | B1 | 8/2005 | Vacek et al. |
| 6,959,074 | B2 | 10/2005 | Berstis |
| 7,023,965 | B2 | 4/2006 | Oates |
| 7,212,613 | B2 | 5/2007 | Kim et al. |
| 7,447,632 | B2 | 11/2008 | Itou |
| 7,702,086 | B2 | 4/2010 | Susen et al. |
| RE41,534 | E | 8/2010 | Blair et al. |
| RE41,608 | E | 8/2010 | Blair et al. |
| 7,839,803 | B1 * | 11/2010 | Snelgrove et al. ............ 370/260 |
| 2003/0023882 | A1 | 1/2003 | Udom |
| 2003/0046554 | A1 | 3/2003 | Leydier et al. |
| 2003/0074201 | A1 | 4/2003 | Grashey et al. |
| 2003/0182119 | A1 | 9/2003 | Junqua et al. |
| 2003/0200087 | A1 | 10/2003 | Aronowitz |
| 2004/0230689 | A1 | 11/2004 | Loveland |
| 2005/0063522 | A1 | 3/2005 | Kim et al. |
| 2005/0096906 | A1 | 5/2005 | Barzilay |
| 2005/0135583 | A1 * | 6/2005 | Kardos ............ 379/142.01 |
| 2006/0036442 | A1 | 2/2006 | Novack et al. |
| 2006/0085189 | A1 | 4/2006 | Dalrymple et al. |
| 2007/0172047 | A1 * | 7/2007 | Coughlan et al. ......... 379/202.01 |
| 2008/0151785 | A1 * | 6/2008 | Sylvain ................ 370/260 |
| 2008/0195395 | A1 | 8/2008 | Kim et al. |

OTHER PUBLICATIONS

Xiang, Bing, Speaker Verification Using Gaussian Component Strings in Dynamic Trajectory Space, 2002, abstract.

Andrews et al., "Phonetic, Idiolectal, and Acoustic Speaker Recognition", US Department of Defense Speech Processing Research, 2001: A Speaker Odyssey, The Speaker Recognition Workshop, Chania, Crete, Greece, Jun. 19, 2001, 19 pages.

* cited by examiner

TELEPHONIC VOICE AUTHENTICATION AND DISPLAY

FIELD OF THE INVENTION

Aspects of the invention relate generally to conference call systems, and more particularly, to a telephonic voice authentication and display system and method.

BACKGROUND OF THE INVENTION

With the advent of conference call systems, most notably in the business world, comes the increasingly common large conference call. With the use of conference call systems becoming more common, the number of locations of conference call attendees and the quantity of actual attendees of conference calls is also increasing. With many conference calls, it can be difficult to identify the instant speaker (i.e., voice owner), especially if there are, multiple, near-contemporaneous speakers. This is made more difficult when there are several attendees, multiple locations, and/or a plurality of types of telephonic systems participating in the conference call.

In view of the foregoing, there is an opportunity to improve upon the related art.

SUMMARY OF THE INVENTION

Aspects of the invention provide an improved solution for identifying conference call participants. In an embodiment of the invention, a method includes detecting a sound of a first conference call participant; identifying the first conference call participant based on the sound; and displaying an attribute of the first conference call participant to a second conference call participant.

A first aspect of the invention provides a method of identifying conference call participants, the method comprising: detecting a sound of a first conference call participant; identifying the first conference call participant based on the sound; and displaying an attribute of the first conference call participant to a second conference call participant.

A second aspect of the invention provides a system for identifying conference call participants, the system comprising: a system for detecting a sound of a first conference call participant; a system for identifying the first conference call participant based on the sound; and a system for displaying an attribute of the first conference call participant to a second conference call participant.

A third aspect of the invention provides a computer program comprising program code stored on a computer-readable medium, which when executed, enables a computer system to implement a method of identifying conference call participants, the method comprising: detecting a sound of a first conference call participant; identifying the first conference call participant based on the sound; and displaying an attribute of the first conference call participant to a second conference call participant.

A fourth aspect of the invention provides a method of deploying a system for identifying conference call participants, the method comprising: providing a computer system operable to: detect a sound of a first conference call participant; identify the first conference call participant based on the sound; and display an attribute of the first conference call participant to a second conference call participant.

A fifth aspect of the invention provides a data processing system for identifying conference call participants, comprising: a processing unit; a bus coupled to the processing unit; and a memory medium coupled to the bus comprising program code, which when executed by the processing unit causes the data processing system to: detect a sound of a first conference call participant; identify the first conference call participant based on the sound; and display an attribute of the first conference call participant to a second conference call participant.

A sixth aspect of the invention provides a business method for identifying conference call participants, the business method comprising: managing a network that includes at least one computer system operable to: detect a sound of a first conference call participant; identify the first conference call participant based on the sound; and display an attribute of the first conference call participant to a second conference call participant; and receiving payment based on the managing.

The illustrative aspects of the invention are designed to solve one or more of the problems herein described and/or one or more other problems not discussed.

BRIEF DESCRIPTION OF THE DRAWINGS

These and other features of the invention will be more readily understood from the following detailed description of the various aspects of the invention taken in conjunction with the accompanying drawings that depict various embodiments of the invention, in which.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide an improved solution for identifying conference call participants. In an embodiment of the invention, a method includes: detecting a sound of a first conference call participant; identifying the first conference call participant based on the sound; and displaying an attribute of the first conference call participant to a second conference call participant. As used herein, unless otherwise noted, the term "set" means one or more (i.e., at least one); and, the phrase "any solution" means any now known or later developed solution.

Figure 1:
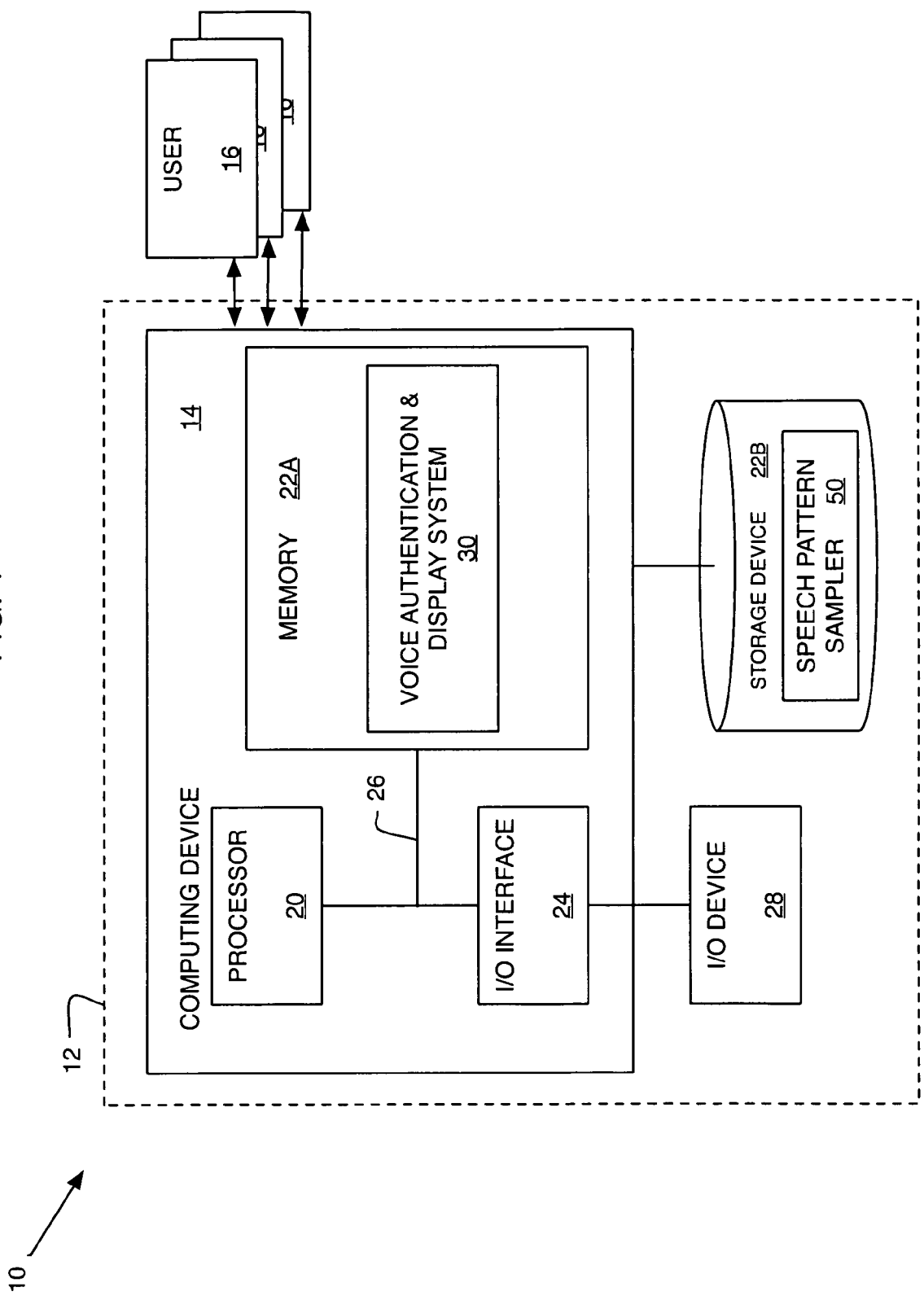
FIG. 1 shows an illustrative environment for applying a conference caller identification method according to an embodiment of the invention.

Turning to the drawings, FIG. 1 shows an illustrative environment 10 for identifying users 16 (e.g., "conference call participants") according to an embodiment of the invention. To this extent, environment 10 includes a computer system 12 that can perform the process described herein in order to identify conference call participants 16. In particular, computer system 12 is shown including a computing device 14 that comprises a voice authentication and display system 30, which makes computing device 14 operable for identify conference call participants 16, by performing the process described herein.

Computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as voice authentication and display system 30, which is stored in a storage system, such as memory 22A and/or storage device 22B. While executing program code, processor 20 can read and/or write data to/from memory 22A, storage device 22B, and/or I/O interface 24. Bus 26 provides a communications link between each of the components in computing device 14. I/O device 28 can comprise any device that transfers information between a user 16 and computing device 14. To this extent, I/O device 28 can comprise a user I/O device to enable an individual user 16 to interact with computing device 14 and/or a communications device to enable a system user to communicate with computing device 14 using any type of communications link.

In any event, computing device 14 can comprise any general purpose computing article of manufacture capable of executing program code installed thereon. However, it is understood that computing device 14 and voice authentication and display system 30 are only representative of various possible equivalent computing devices that may perform the process described herein. To this extent, in other embodiments, the functionality provided by computing device 14 and voice authentication and display system 30 can be implemented by a computing article of manufacture that includes any combination of general and/or specific purpose hardware and/or program code. In each embodiment, the program code and hardware can be created using standard programming and engineering techniques, respectively.

Similarly, computer system 12 is only illustrative of various types of computer systems for implementing aspects of the invention. For example, in one embodiment, computer system 12 comprises two or more computing devices that communicate over any type of communications link, such as a network, a shared memory, or the like, to perform the process described herein. Further, while performing the process described herein, one or more computing devices in computer system 12 can communicate with one or more other computing devices external to computer system 12 using any type of communications link. In either case, the communications link can comprise any combination of various types of wired and/or wireless links; comprise any combination of one or more types of networks; and/or utilize any combination of various types of transmission techniques and protocols.

Figure 2:
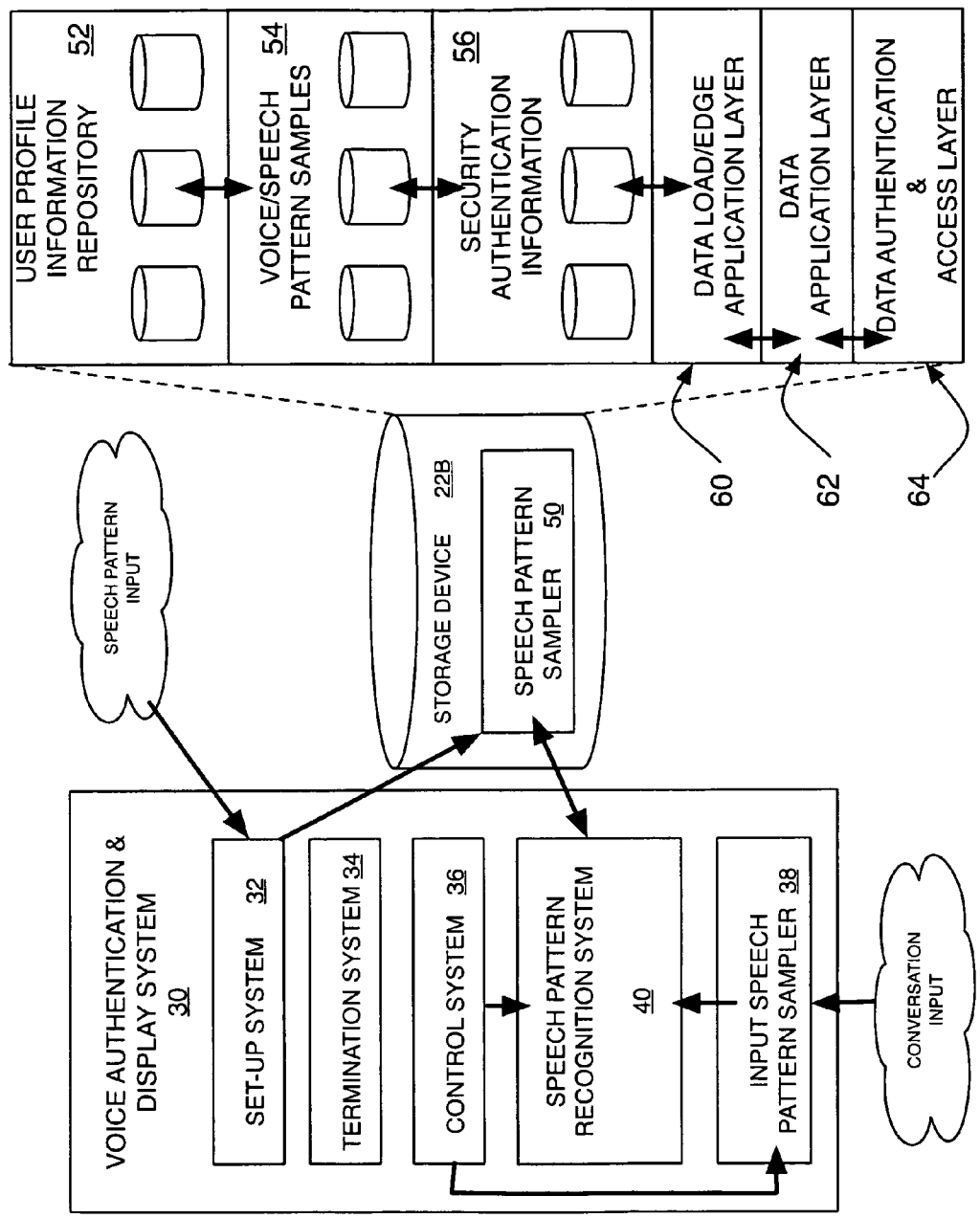
FIG. 2 shows an illustrative diagram of a portion of the system in FIG. 1 according to an embodiment of the invention.

As discussed herein, voice authentication and display system 30 enables computer system 12 to identify conference call participants 16. To this extent, voice authentication and display system 30 is shown in FIG. 2, as including a set-up system 32, a termination system 34, a control system 36, an input speech pattern sampler 38, and a speech pattern recognition system 40. Operation of each of these entities is discussed further herein. However, it is understood that some of the various entities shown in FIG. 1 can be implemented independently, combined, and/or stored in memory of one or more separate computing devices that are included in computer system 12. Further, it is understood that some of the entities and/or functionality may not be implemented, or additional entities and/or functionality may be included as part of computer system 12.

Conference call participant 16 may be any quantity (e.g., 1, 2, . . . N) of entities (e.g., person, group, machine generated voice, etc.) who are connected together, via any suitable conference calling system, so as to conduct a conference call. The participants 16 may be using any type of communication system, such as a system that utilizes digital signals (e.g., Voice over Internet Protocol (VoIP) system), or a system that utilizes analog system (e.g., a traditional telephone circuit system), and/or the like.

Aspects of the invention provide an improved solution for identifying conference call participants 16. To this extent, FIGS. 2 through 4 show illustrative diagrams of an application of the system 10 in FIG. 1 during a conference call session, according to embodiments of the invention.

As shown, for example, in FIG. 2, the voice authentication & display system 30 may include a set-up system 32 that receives speech pattern input which may store in storage device 22B a speech pattern sampler 50. In this manner, various user(s) 16 speech patterns may be input and stored for future use. The speech pattern sampler 50 may further comprise a user profile information repository 52, voice/speech pattern samples 54, security authentication information 56, data load/edge application layer 60, data application layer 62, data authentication and access layer 64, and/or the like.

Figure 3:
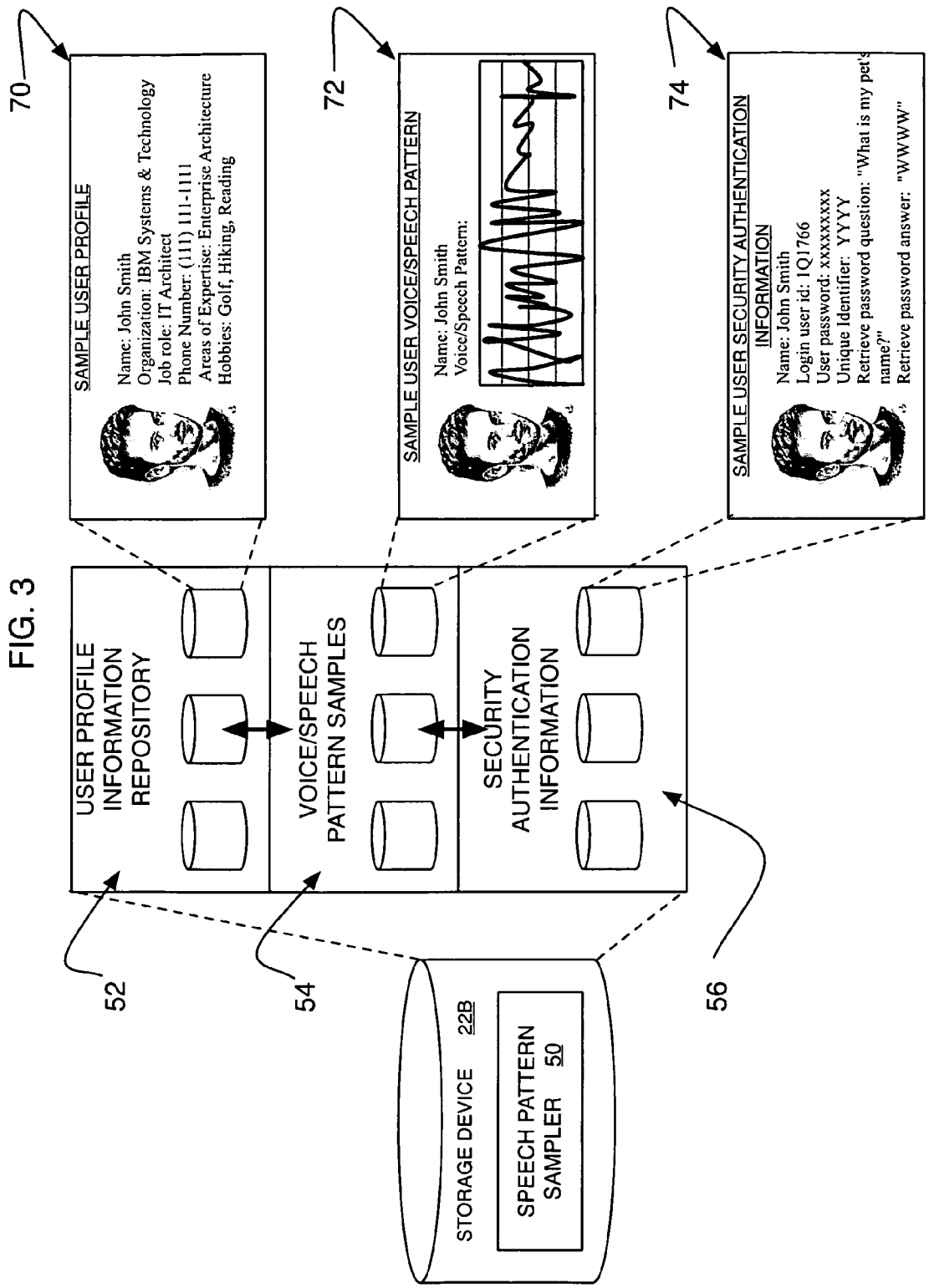
FIG. 3 shows an illustrative diagram of a more detailed portion of the system in FIG. 1 according to an embodiment of the invention.
Figure 4:
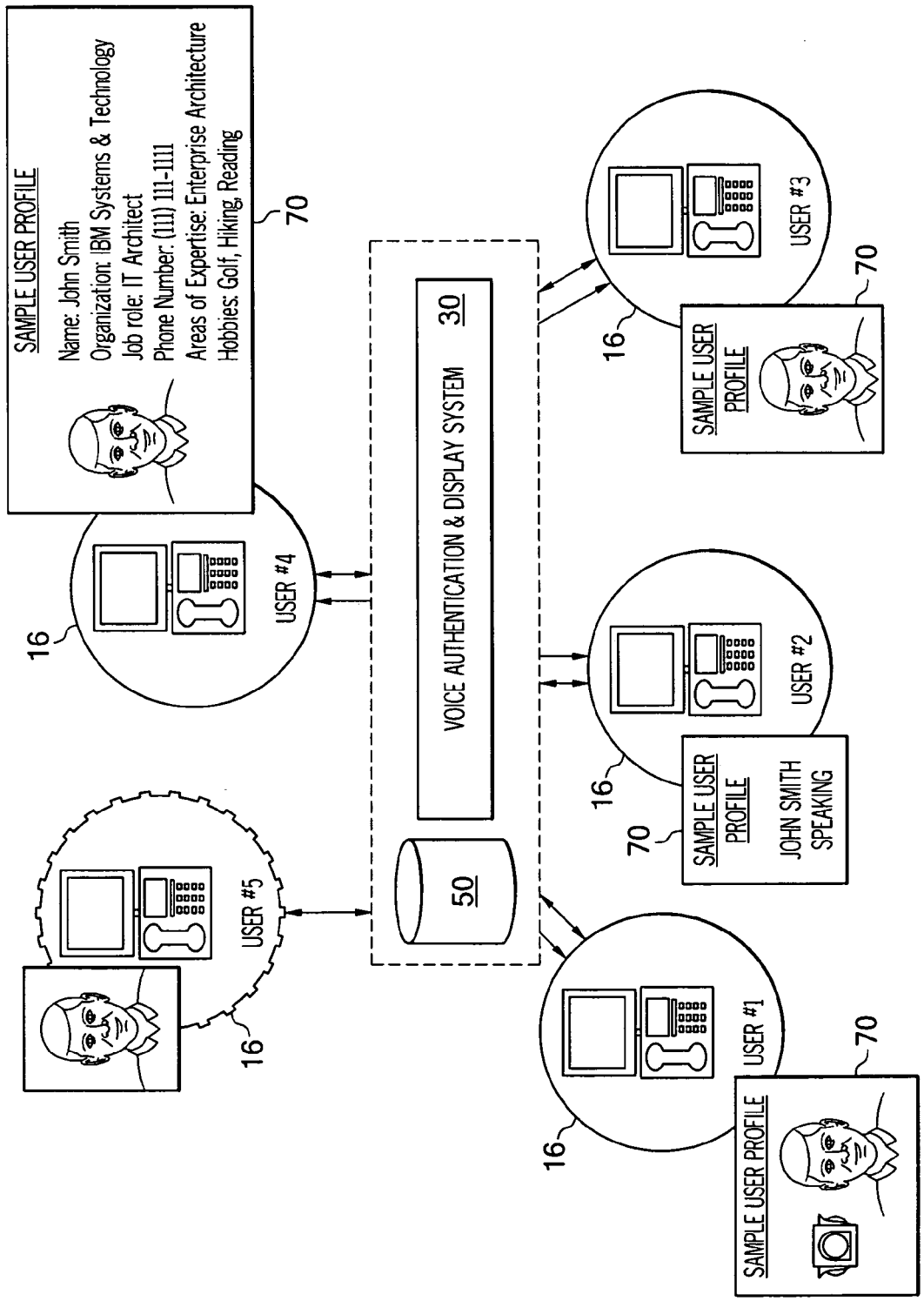
FIG. 4 shows another illustrative diagram of the system in FIG. 1 being applied to a conference call according to an embodiment of the invention.

Referring to both FIGS. 2 and 3, the voice authentication and display system 30 includes a set-up system 30 that captures and stores (e.g., in speech pattern sampler 50) an authentic user 16 speech sample. The speech pattern recognition system 40 may compare the authentic user speech pattern sample stored in the voice/speech pattern samples 54 with an conversation input obtained by input speech pattern sampler 38 and then generates a comparison result. In this manner, the speech recognition system 40 can effectively identify the speaker. The control system 36 may control access to any of the telephonic devices in the conference call, and further may analyze the comparison result for the initial input speech pattern sample and/or periodically or continually analyze comparison results for ongoing inputted sampled received during the conference call. The input speech pattern sample may be obtained at the initiation of the conference call or at a temporally different time than the conference call.

As FIG. 3 shows, the speech pattern sampler 50 may store a plurality of information which includes user profiles 70, user voice/speech patterns 72, and user security authentication information 74.

Referring further to FIG. 4, five users 16 may be conducting a conference call. In the example, the users 16 include User #1, User #2, User #3, User #4, and User #5, wherein User #5 is further identified as John Smith. In any event, user John Smith starts talking. An alert may get sent out to the other users (i.e., User #1, User #2, User #3, and User #4) that User #5 (i.e., John Smith) is speaking. The voice authentication and display system 30 may, for example, include a picture (e.g., rendering, photo, etc.), a name, other information (e.g., phone, organization, title, hobbies, job role, etc.) to the other conference call participants as shown by a user profile 70. As shown, various attributes may be shown to one, or more, conference call participant. For example, different conference call participants may receive different attributes. In FIG. 4, User #4 receives a 'full' user profile 70 (e.g., photo, detailed information), while User #3 merely receives a profile 70 that merely displays a picture of John Smith. Contrastingly, User #2 receives a profile 70 that is in the form of text that reads, for example, "John Smith Speaking", while, similarly, User #1 receives a profile 70 that comprises a picture of John Smith therein along with an indicia (e.g., light on, color, font appearance, etc.) that John Smith is speaking. Depicted in FIG. 4 is a traffic-type light that "lights" next to John Smith's photo to indicate that John Smith is speaking.

It should be apparent to one in the art that variations of this embodiment are part and parcel of the present invention. In any event, embodiments of the present invention display an attribute and/or an indicia of the first conference call participant to the other conference call participant(s) upon the detection by the voice authentication and display system 30 that the first conference call participant (e.g., John Smith) is speaking. Note that each of the conference call participants on the conference call may receive a pop-up type display of John Smith and/or his profile. This serves to notify the other users ultimately of who is talking. Display information may be dependent on each participant's 16 individual listening device. For example, the attribute and/or indicia may be displayed through rich graphic user interface (GUI), through simple text base notification, and/or the like. In an embodiment, devices that are limited to only display text would therefore be notified through a quick voice prompt of who is talking (e.g., voice over that states "John Smith is now speaking").

In another embodiment, the invention provides a computer program stored on a computer-readable medium, which when executed, enables a computer system to identify conference call participants 16. To this extent, the computer-readable medium includes program code, such as voice authentication and display system 30 (FIG. 1), which implements the process described herein. It is understood that the term "computer-readable medium" comprises one or more of any type of tangible medium of expression capable of embodying a copy of the program code (e.g., a physical embodiment). In particular, the computer-readable medium can comprise program code embodied on one or more portable storage articles of manufacture, on one or more data storage portions of a computing device, such as memory 22A (FIG. 1) and/or storage system 22B (FIG. 1), as a data signal traveling over a network (e.g., during a wired/wireless electronic distribution of the computer program), on paper (e.g., capable of being scanned and converted to electronic data), and/or the like.

In another embodiment, the invention provides a method of deploying a system for identifying conference call participants 16. In this case, a computer system, such as computer system 12 (FIG. 1), can be obtained (e.g., created, maintained, having made available to, etc.) and one or more programs/systems for performing the process described herein can be obtained (e.g., created, purchased, used, modified, etc.) and deployed to the computer system. To this extent, the deployment can comprise one or more of: (1) installing program code on a computing device, such as computing device 14 (FIG. 1), from a computer-readable medium; (2) adding one or more computing devices to the computer system; and (3) incorporating and/or modifying one or more existing devices of the computer system, to enable the computer system to perform the process described herein.

In still another embodiment, the invention provides a business method that identifies conference call participants 16, which enables users to perform the process described herein on a subscription, advertising, and/or fee basis. That is, a service provider could offer to manage a network and/or a computer system 12 (FIG. 1) that allows users to identify conference call participants 16 as described herein. In this case, the service provider can manage (e.g., create, maintain, support, etc.) a virtual and/or physical network that enables users to communicate content using computer systems, such as computer system 12, that perform the process described herein. In return, the service provider can receive payment from the user(s) under a subscription and/or fee agreement, receive payment from the sale of advertising to one or more third parties, and/or the like.

As used herein, it is understood that "program code" means any set of statements or instructions, in any language, code or notation, that cause a computing device having an information processing capability to perform a particular function either directly or after any combination of the following: (a) conversion to another language, code or notation; (b) reproduction in a different material form; and/or (c) decompression. To this extent, program code can be embodied as any combination of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of identifying conference call participants, the method comprising:
   detecting, with a computer device, a sound of a first conference call participant;
   identifying, with the computer device, the first conference call participant based on the sound; and
   providing for display, with the computer device, an attribute used to identify the first conference call participant from a profile of the first conference call participant to a second conference call participant, wherein the providing is configured to provide a different attribute used to identify the first conference call participant from the profile of the first conference call participant to a third conference call participant;
   wherein the attribute comprises at least one of: a picture, a name, a phone number, organization, title, hobbies, job role, and combinations thereof.

2. The method of claim 1, the displaying further comprising providing an indicator that the first conference call participant is speaking.

3. The method of claim 1, the identifying comprising:
   comparing an authentic user speech pattern sample with an inputted speech sample; and
   generating a result from the comparing.

4. The method of claim 1, further comprising:
   controlling access to a telephonic device, the controlling comprising:
   receiving an initial inputted speech pattern sample when a conference call is initiated;
   analyzing a comparison result for the initial inputted speech pattern sample; and
   periodically analyzing the comparison result with a plurality of ongoing input samples received during the conference call.

5. The method of claim 1, wherein the first conference call participant and second conference call participant use one of: a Voice over Internet Protocol (VoIP) system or a telephone circuit system.

6. The method of claim 1, wherein the displaying coincides with speaking by the first conference call participant.

7. The method of claim 1, wherein the sound comprises a voice by the first conference call participant.

8. A computer system for identifying conference call participants, the system comprising:
   a computer device including:

a processor; and a memory, the memory storing instructions which when executed cause the computer device to perform the steps of:

detecting a sound of a first conference call participant;

identifying the first conference call participant based on the sound; and providing for display an attribute used to identify the first conference call participant from a profile of the first conference call participant to a second conference call participant, wherein the providing is configured to provide a different attribute used to identify the first conference call participant from the profile of the first conference call participant to a third conference call participant;

wherein the attribute comprises at least one of: a picture, a name, a phone number, organization, title, hobbies, job role, and combinations thereof.

9. The system of claim 8, the providing for display further comprising providing an indicator that the first conference call participant is speaking.

10. The system of claim 8, the identifying comprising:

comparing an authentic user speech pattern sample with an inputted speech sample; and generating a result from the comparing.

11. The system of claim 8, the steps further comprising:

receiving an initial inputted speech pattern sample when a conference call is initiated;

analyzing a comparison result for the initial inputted speech pattern sample; and periodically analyzing the comparison result with a plurality of ongoing input samples received during the conference call.

12. A computer program comprising program code stored on a computer-readable device, which when executed, enables a computer system to implement a method of identifying conference call participants, the method comprising:

detecting a sound of a first conference call participant;

identifying the first conference call participant based on the sound; and providing for display an attribute used to identify the first conference call participant from a profile of the first conference call participant to a second conference call participant, wherein the providing is configured to provide a different attribute used to identify the first conference call participant from the profile of the first conference call participant to a third conference call participant;

wherein the attribute comprises at least one of: a picture, a name, a phone number, organization, title, hobbies, job role, and combinations thereof.

13. The computer program of claim 12, the providing for display further comprising providing an indicator that the first conference call participant is speaking.

14. The computer program of claim 12, the identifying comprising:

comparing an authentic user speech pattern sample with an inputted speech sample; and generating a result from the comparing.

15. The computer program of claim 12, wherein the displaying coincides with speaking by the first conference call participant.

16. The computer program of claim 12, the method further comprising:

controlling access to a telephonic device, the controlling comprising:

receiving an initial inputted speech pattern sample when a conference call is initiated;

analyzing a comparison result for the initial inputted speech pattern sample; and periodically analyzing the comparison result with a plurality of ongoing input samples received during the conference call.

17. A method of deploying a system for identifying conference call participants, the method comprising:

providing a computer system operable to:

detect a sound of a first conference call participant;

identify the first conference call participant based on the sound; and provide for display an attribute used to identify the first conference call participant from a profile of the first conference call participant to a second conference call participant, wherein the providing is configured to provide a different attribute used to identify the first conference call participant from the profile of the first conference call participant to a third conference call participant;

wherein the attribute comprises at least one of: a picture, a name, a phone number, organization, title, hobbies, job role, and combinations thereof.

18. A business method for identifying conference call participants, the business method comprising:

managing a network that includes at least one computer system having at least one computer device operable to:

detect a sound of a first conference call participant;

identify the first conference call participant based on the sound; and provide for display an attribute used to identify the first conference call participant from a profile of the first conference call participant to a second conference call participant, wherein the providing is configured to provide a different attribute used to identify the first conference call participant from the profile of the first conference call participant to a third conference call participant; and receiving payment based on the managing;

wherein the attribute comprises at least one of: a picture, a name, a phone number, organization, title, hobbies, job role, and combinations thereof.

* * * * *